(12) United States Patent
Feche et al.

(10) Patent No.: US 11,879,093 B2
(45) Date of Patent: Jan. 23, 2024

(54) CORROSION-INHIBITING SURFACTANTS

(71) Applicant: STEPAN COMPANY, Northfield, IL (US)

(72) Inventors: Maxime Feche, Grenoble (FR); Mathieu Pepin, Grenoble (FR); Elodie Shaw, Fontaine (FR); Laure Canal, Grenoble (FR); José Santiago, Limony (FR); Milan Bartos, Sugar Land, TX (US); Alla Crabtree, Katy, TX (US)

(73) Assignee: STEPAN COMPANY, Northfield, IL (US)

( * ) Notice: Subject to any disclaimer, the term of this patent is extended or adjusted under 35 U.S.C. 154(b) by 160 days.

(21) Appl. No.: 17/622,678

(22) PCT Filed: Jul. 29, 2020

(86) PCT No.: PCT/IB2020/057170
§ 371 (c)(1),
(2) Date: Dec. 23, 2021

(87) PCT Pub. No.: WO2021/019470
PCT Pub. Date: Feb. 4, 2021

(65) Prior Publication Data
US 2022/0363977 A1 Nov. 17, 2022

Related U.S. Application Data

(60) Provisional application No. 62/879,726, filed on Jul. 29, 2019.

(51) Int. Cl.
*C09K 8/54* (2006.01)
*C23F 11/14* (2006.01)

(52) U.S. Cl.
CPC .............. *C09K 8/54* (2013.01); *C23F 11/141* (2013.01); *C09K 2208/32* (2013.01)

(58) Field of Classification Search
None
See application file for complete search history.

(56) References Cited

U.S. PATENT DOCUMENTS

| 8,518,868 B2 | 8/2013 | Hernandez Altamirano |
| 9,228,089 B2 | 1/2016 | Hellberg |

(Continued)

FOREIGN PATENT DOCUMENTS

| AR | 031936 A1 | 10/2003 |
| CN | 102533238 | 7/2012 |

(Continued)

OTHER PUBLICATIONS

Bhadani Avinash et al, "Self-aggregation properties of new ester-based gemini surfactants and their rheological behavior in the presence of cosurfactant—monola", Colloids and Surfaces A: Physiochemical and Engineering Aspects, Elsevier, Amsterdam, NL, (Aug. 10, 2014), vol. 461, doi:10.1016/J.COLSURFA.2014.08.001, ISSN 0927-7757, pp. 258-266, XP029065711.

(Continued)

*Primary Examiner* — John J Figueroa
(74) *Attorney, Agent, or Firm* — Dilworth IP, LLC

(57) ABSTRACT

A method for inhibiting corrosion of pipelines and other metal surfaces, particularly those used in the oil-and-gas industry, is disclosed. The method comprises treating a brine-exposed metal surface with a film-forming composition. The composition comprises a quaternary surfactant, which is made by reacting a polyalkylene glycol (PAG), a haloalkanoic acid, and a tertiary fatty amine that optionally incorporates amide or ester functionality. The surfactant comprises a PAG monoester quat and a PAG diester diquat and may have other components. The quaternary surfactants provide good corrosion protection and can partition effectively from an oily phase into a brine phase in the absence of agitation. The surfactants are easy to synthesize economi- (Continued)

cally and have structures that can be tailored to meet local HLB requirements.

20 Claims, 10 Drawing Sheets

(56) References Cited

U.S. PATENT DOCUMENTS

| | | | | |
|---|---|---|---|---|
| 10,626,319 | B1* | 4/2020 | Obot | C09K 8/54 |
| 11,518,932 | B2* | 12/2022 | Quraishi | C23F 11/04 |
| 11,525,081 | B2* | 12/2022 | Obot | C09K 8/54 |
| 2004/0169161 | A1 | 9/2004 | Dahlmann | |
| 2006/0180794 | A1 | 8/2006 | Goddard | |
| 2011/0071056 | A1 | 3/2011 | Saini | |
| 2012/0114523 | A1* | 5/2012 | Hellberg | C02F 5/12 |
| | | | | 422/7 |
| 2014/0200168 | A1 | 7/2014 | Misra | |
| 2017/0247798 | A1* | 8/2017 | Moloney | C23F 11/145 |
| 2018/0030000 | A1* | 2/2018 | Gill | C07D 249/18 |

FOREIGN PATENT DOCUMENTS

| | | |
|---|---|---|
| DE | 3329444 | 3/1985 |
| EP | 2497844 | 9/2012 |
| WO | 2019082205 | 5/2019 |

OTHER PUBLICATIONS

Yang Chunpeng et al, "Self-assembly properties of ultra-long-chain gemini surfactants bearing multiple amide groups with high performance in fracturing fluid application", Colloids and Surfaces A: Physiochemical and Engineering Aspects, Elsevier, Amsterdam, NL, (Apr. 2, 2017), vol. 523, doi:10.1016/J.COLSURFA.2017.03. 062, ISSN 0927-7757, pp. 62-70, XP085063586.

* cited by examiner

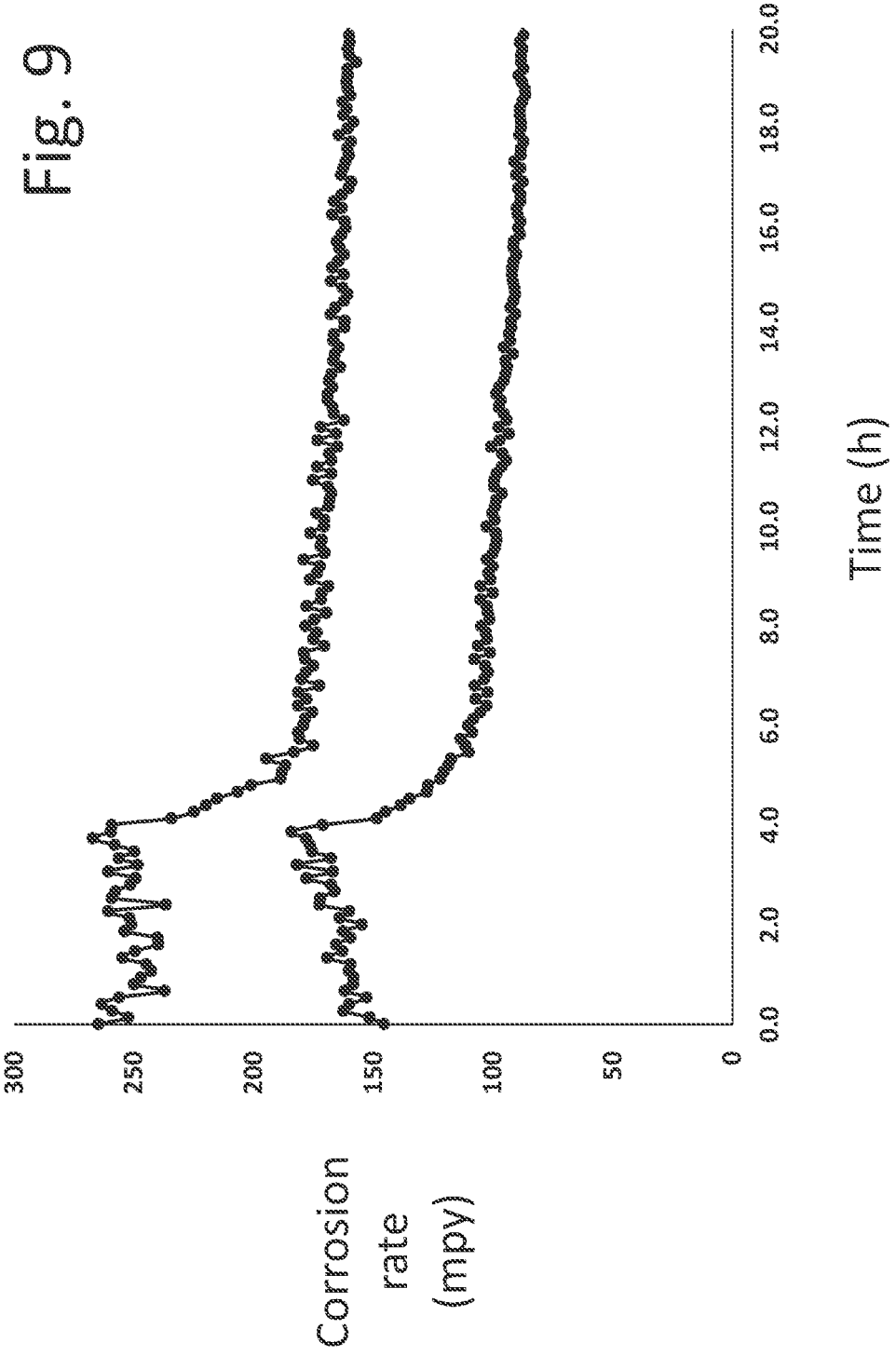

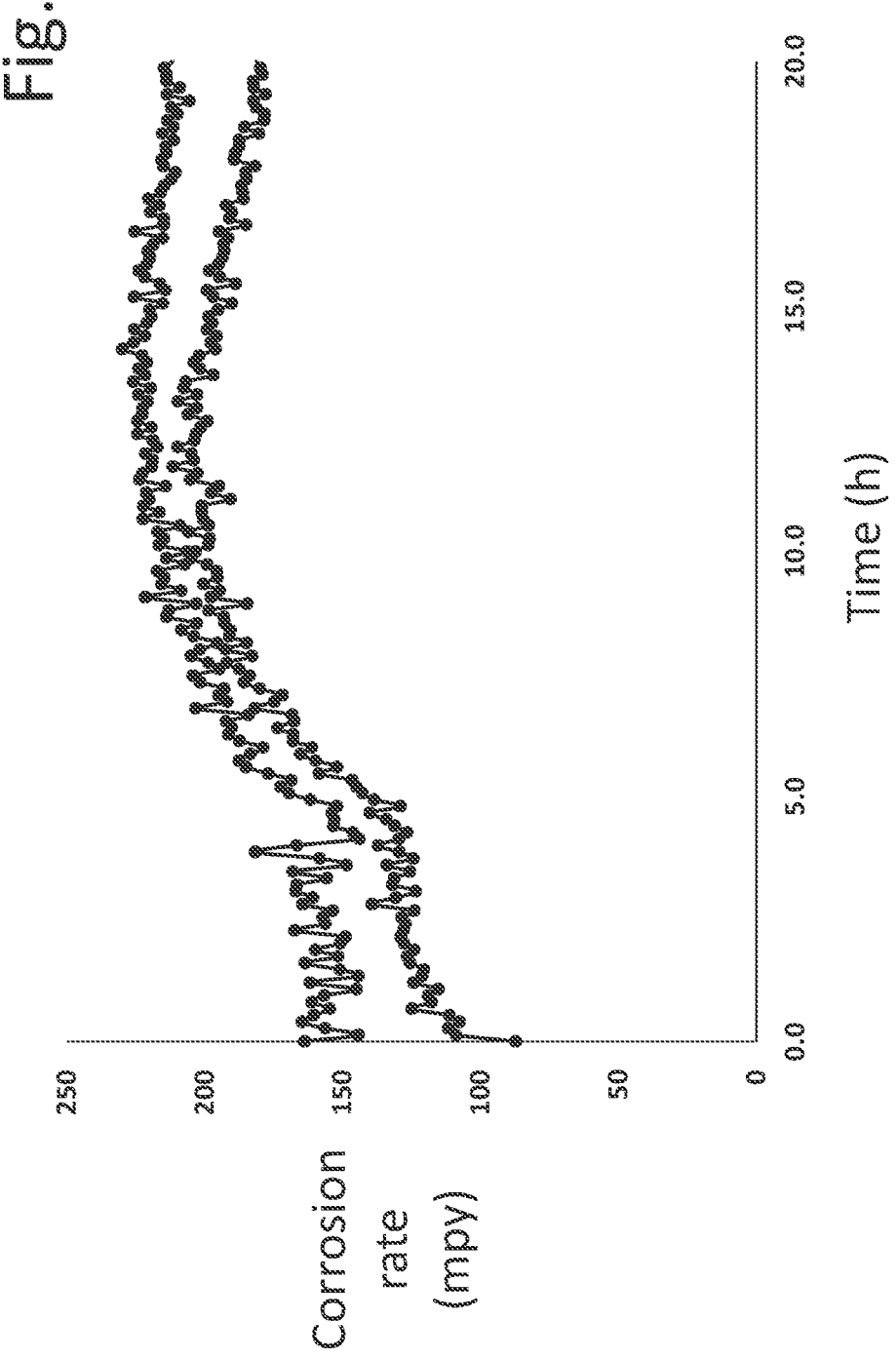

CORROSION-INHIBITING SURFACTANTS

FIELD OF THE INVENTION

The invention relates to quaternary surfactants and their use to inhibit corrosion, especially in oilfield applications.

BACKGROUND OF THE INVENTION

Corrosion inhibitors are used in a wide variety of industrial applications, including fuels, paints, coolants, boiler water, engine oils, and oilfield applications. For example, the oilfield chemicals industry relies on inhibitor compositions to ward off the corrosion of metal equipment, especially pipelines, caused by acidic species, including carbon dioxide, hydrogen sulfide, organic acids, and inorganic acids. Suitable corrosion inhibitors require a balance of hydrophilicity (to be soluble in aqueous media) and hydrophobicity (to repel water from metal surfaces), and they must meet increasingly stringent regulatory requirements. For instance, treatment chemicals used offshore in the North Sea must meet current OSPAR requirements for aquatic toxicity, biodegradability, and bioaccumulation.

"Gemini" surfactants, which traditionally have a pair of hydrophobic tails, a pair of closely spaced hydrophilic, charged heads, and a spacer group, have been studied extensively in academia, but they have not been used much as corrosion inhibitors. For exceptions, see U.S. Pat. No. 8,518,868 and U.S. Publ. No. 2011/0071056. Moreover, the structures of corrosion inhibitors taught for use in the oilfield chemicals industry varies widely (see, e.g., EP 2 497 844, U.S. Pat. No. 9,228,089, and U.S. Publ. Nos. 2004/0169161, 2006/0180794, and 2014/0200168).

Bhadani et al., *Colloids and Surfaces A: Physiochem. Eng. Aspects* 461 (2014) 258 describes properties of ester-based Gemini surfactants wherein the spacer group is ethylene glycol, diethylene glycol, or triethylene glycol. The surfactants are made by first reacting the glycol with two equivalents of bromoacetic acid to give a bis($\alpha$-bromoacetate). Reaction with two equivalents of an N,N-dimethyl fatty amine gives the corresponding ester-functional diquaternary composition. Use of these compositions as corrosion inhibitors is not explored.

Similar compositions in which the spacer group is a polyethylene glycol rather than, e.g., ethylene glycol, are described in DE 3329444. The synthetic approach is also similar. The examples show how to react polyethylene glycols with two equivalents of monochloroacetic acid to produce bis($\alpha$-chloroacetates), followed by reaction with an N,N-dimethyl fatty amine or an N,N-dimethyl fatty amidoamine to give ester-functional diquaternary compositions. Use of the compositions as corrosion inhibitors is not described.

The industry would benefit from the availability of easily synthesized, economical, effective corrosion inhibitors that could be fine-tuned to adapt to various hydrophile/lipophile (HLB) balances, salinity conditions, and sweet or sour environments. Ideally, the corrosion inhibitors would meet or exceed applicable regulatory requirements for toxicity and biodegradability.

SUMMARY OF THE INVENTION

In one aspect, the invention relates to a corrosion inhibition method. The method comprises inhibiting corrosion of a metal surface that is exposed to an aqueous brine, especially in an oilfield application, by treating the surface with a film-forming composition. The composition comprises a quaternary surfactant that is made by reacting a polyalkylene glycol (PAG), a haloalkanoic acid, and a tertiary fatty amine that optionally incorporates amide or ester functionality. The resulting surfactant comprises a PAG monoester quat and a PAG diester diquat.

We surprisingly found that the quaternary surfactants provide good corrosion protection and can partition effectively from an oily phase into a brine phase in the absence of agitation. The surfactants are easy to synthesize economically and have structures that can be tailored to meet local HLB requirements.

BRIEF DESCRIPTION OF THE DRAWINGS

FIG. 9 plots results from a bubble test in NACE 3.5% brine for comparative corrosion inhibitor I.

FIG. 10 plots results from a bubble test in NACE 3.5% brine for comparative corrosion inhibitor M.

DETAILED DESCRIPTION OF THE INVENTION

Figure 1:
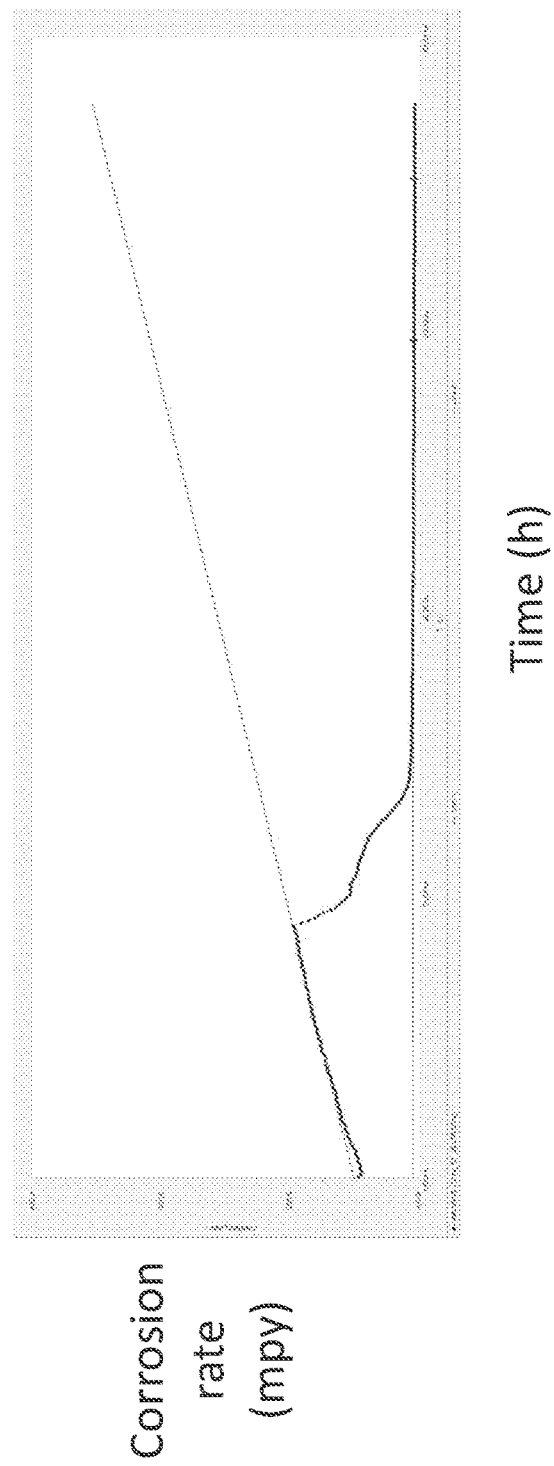
FIG. 1 plots results from a linear polarization resistance (LPR) test to measure corrosion resistance versus time for inventive corrosion inhibitor A.

In one aspect, the invention relates to a method for inhibiting corrosion of a metal surface, preferably in an oil well or gas well, by an aqueous brine. The metal surface is treated with a film-forming composition comprising a quaternary surfactant made by reacting a polyalkylene glycol (PAG), a haloalkanoic acid, and a tertiary fatty amine that optionally incorporates amide or ester functionality to give a surfactant mixture comprising a PAG monoester quat and a PAG diester diquat.

The Film-Forming Composition

The film-forming composition comprises as one component a quaternary surfactant, which is described further below. The composition can include other components that promote formation of a corrosion-protective film on a metal surface in the presence of an aqueous brine that would otherwise corrode the metal at a higher rate. These other components can include, for instance, additional corrosion inhibitors, sulfur-containing intensifiers (e.g., mercaptoethanol, thiosulfates), scale inhibitors, hydrogen sulfide scavengers, hydrocarbon oils, other surfactants, solvents, coalescing aids, and the like. In some aspects, the quaternary surfactant will be a principal component of the film-forming composition; in other aspects, the quaternary surfactant can be a minor component. In some aspects, the quaternary surfactant will make up from 30 to 100 wt. %, or from 50 to 100 wt. %, of the film-forming composition.

The Quaternary Surfactant And Synthetic Methods

The inventive method utilizes a quaternary surfactant. In some aspects, the surfactant is a composition made by reacting a polyalkylene glycol with a haloalkanoic acid, followed by reaction with a tertiary fatty amine that optionally incorporates amide or ester functionality. Similar surfactants produced with chloroacetic acid have been described previously (see, e.g., DE 3329444).

An advantage of the quaternary surfactants is their ease and economy of synthesis from readily available starting materials: polyalkylene glycols ("PAG"), haloalkanoic acids, and fatty amines.

Suitable polyalkylene glycols are homopolymers and random or block copolymers of ethylene oxide (EO), propylene oxide (PO), and/or butylene oxides. Preferred polyalkylene glycols are EO homopolymers (polyethylene glycols or "PEG") and copolymers of EO with a minor proportion (less than 30, 20 or 10 mole %) of PO. Polyethylene glycols in a wide variety of number-average molecular weights are commercially available from Dow Chemical and other suppliers. In some aspects, the PAG has a number-average molecular weight within the range of 200 g/mol to 4000 g/mol, from 200 g/mol to 2500 g/mol, or from 500 g/mol to 2000 g/mol, particularly from 600 g/mol to 1500 g/mol. In preferred aspects, the PAG is a PEG having a number-average molecular weight within the range of 200 g/mol to 2500 g/mol, or from 500 g/mol to 2000 g/mol, particularly from 600 g/mol to 1500 g/mol.

Suitable haloalkanoic acids for use herein have a linear or branched chain of 1 to 6 carbons attached to a —COOH group and have a halogen, preferably Cl or Br, attached to one carbon of the chain, preferably at the chain end. Examples include chloroacetic acid, bromoacetic acid, iodoacetic acid, 2-chloropropionic acid, 3-chloropropionic acid, 2-chlorobutyric acid, 2-chloro-2-methylpropionic acid, 4-bromobutyric acid, 5-iodovaleric acid, and the like, and mixtures thereof. Chloroacetic acid is readily available and is preferred.

In a first reaction step, a PAG of desirable molecular weight is reacted with the haloalkanoic acid, optionally in the presence of an esterification catalyst (e.g., titanium(IV) butoxide), to produce a mixture comprising mono- and bis(haloalkyl ester)s of the PAG. This step is conveniently accomplished by simply combining the reactants and heating at a temperature within the range of 80° C. to 200° C., preferably from 100° C. to 160° C., while removing water generated in the reaction, for a time effective to produce the mixture of mono- and bis(haloalkyl ester)s. In some aspects, at least two molar equivalents of the haloalkanoic acid is used. The reaction progress is conveniently monitored by measuring the acid value, which decreases as the carboxylic acid groups are converted to ester groups.

In a second reaction step, the mono-/bis(haloalkyl ester) mixture is reacted with a tertiary fatty amine to produce the desired quaternary surfactant. The reaction is conveniently accomplished by combining and mixing the reactants. It is usually desirable to heat the mixture at a temperature within the range of 40° C. to 100° C., preferably from 60° C. to 80° C. On occasion, it may be desirable to add a solvent to the reaction mixture to keep the mixture easily stirred. An aliphatic alcohol such as isopropyl alcohol is convenient for this purpose.

Suitable tertiary fatty amines are well known. Many are commercially available; others are easily synthesized by well-known methods. Some of the tertiary fatty amines are derived from natural oils. The tertiary fatty amines can have one or two fatty chains attached to nitrogen. The fatty chains can be linear or branched, saturated or unsaturated. The remaining alkyl group(s) are preferably $C_1$-$C_4$ alkyl groups. In some aspects, the remaining alkyl group(s) can be linked to the nitrogen by one or more $C_2$-$C_4$ oxyalkylene groups. As used herein, "tertiary fatty amine" refers to compositions that can include a fatty chain that incorporates either an amide or ester functionality, such as the amidoamines and esteramines discussed below. If desired, the quaternary surfactants can be produced in stepwise fashion from tertiary fatty amines with different chain lengths and/or different functional groups to make non-symmetric structures.

In some aspects, one or more of the fatty chains of the tertiary fatty amines incorporate amide or ester functionality. Tertiary fatty amines that incorporate amide functionality are often identified as "amidoamines." Tertiary fatty amidoamines can be made by reacting fatty esters or fatty acids with an N,N-dimethylalkylamine such as N,N-dimethylpropylamine ("DMAPA"). Tertiary fatty amines that incorporate an ester functionality can also be used. These are conveniently made by reacting a hydroxy-functional amine with a fatty acid or fatty ester. In one example, a tertiary fatty amine having ester functionality is made by reacting N,N-dimethylethanolamine with a $C_{10}$-$C_{24}$, preferably a $C_{12}$-$C_{20}$ fatty ester or a $C_{10}$-$C_{24}$, preferably a $C_{12}$-$C_{20}$ fatty acid. In another example, an ester-functional tertiary fatty amine having two ester-functional fatty chains is made by reacting N-methyl-diethanolamine with two equivalents of a $C_{10}$-$C_{24}$, preferably a $C_{12}$-$C_{20}$ fatty ester or a $C_{10}$-$C_{24}$, preferably a $C_{12}$-$C_{20}$ fatty acid.

Thus, suitable tertiary fatty amines include the following merely exemplary structures (to show optional incorporation of ester or amide functionality):

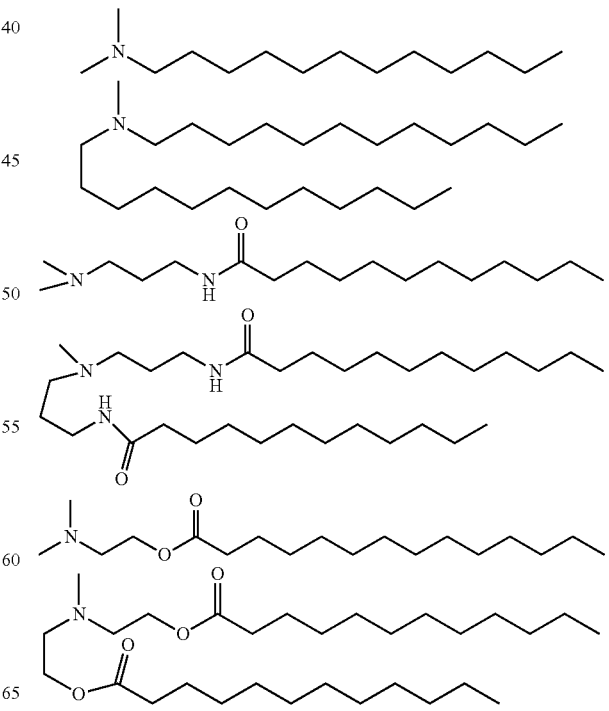

Suitable fatty amines include N,N-dialkyl N-alkyl fatty amines. In some aspects, the N,N-dialkyl N-alkyl fatty amine is an N,N-dimethyl N-alkyl fatty amine. In some aspects, the fatty portion of the amine has from 10 to 24 carbons, preferably from 12 to 20 carbons or from 16 to 18 carbons.

The surfactant mixture comprises a PAG monoester quat and a PAG diester diquat. In some aspects, the PAG diester diquat has the structure:

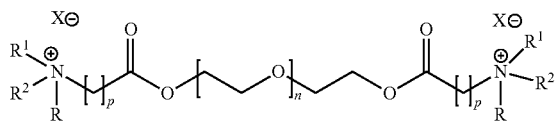

and the PAG monoester quat has the structure:

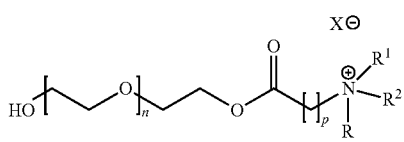

wherein X is OH, Cl, Br, I, or F; each R is independently a $C_{10}$-$C_{24}$ alkyl group that optionally incorporates an amide or ester functionality; $R^1$ is $C_1$-$C_4$ alkyl or $R^3[OA]_m$-; $R^3$ is $C_1$-$C_4$ alkyl; OA is a $C_2$-$C_4$ oxyalkylene group; m is from 1 to 5; p is from 1 to 5; $R^2$ is R or $R^1$; and n is within the range of 4 to 90, preferably from 8 to 50. Preferably, X is C; or Br, more preferably Cl. In some aspects, R is a $C_{12}$-$C_{20}$ alkyl or alkylamido group, a $C_{14}$-$C_{18}$ alkyl or alkylamido group, or a $C_{16}$-$C_{18}$ alkyl or alkylamido group. In preferred aspects, R is a $C_{16}$-$C_{18}$ alkyl group. In some aspects, $R^1$ is ethyl or methyl, preferably methyl. In some aspects, OA is oxyethylene and/or oxypropylene, preferably oxyethylene. In some aspects, m is 1 or 2. In some aspects, p is from 1 to 3, preferably 1.

In some aspects, the PAG diester diquat has the structure:

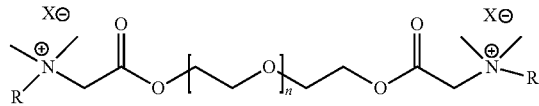

and the PAG monoester quat has the structure:

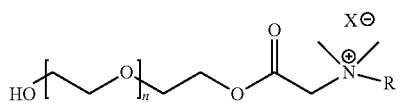

wherein X is Cl or Br, preferably Cl; each R is independently a $C_{16}$-$C_{18}$ alkyl group; and n is within the range 8 to 50. In some aspects, n is within the range of 9 to 15, as when PEG 600 is used as a reactant; in other aspects, n is within the range of 30 to 40, as when PEG 1500 is used as a reactant.

In some aspects, the surfactant is made by reacting a polyalkylene glycol with chloroacetic acid, followed by a reaction with an N,N-dialkyl $C_{16}$-$C_{18}$ fatty amine, preferably an N,N-dimethyl $C_{16}$-$C_{18}$ fatty amine, or with an N,N-dialkyl $C_{16}$-$C_{18}$ fatty amidoamine, preferably an N,N-dimethyl $C_{16}$-$C_{18}$ fatty amidoamine.

In some aspects, the quaternary surfactant is produced by reacting PEG 600 or PEG 1500 with at least two molar equivalents of a haloacetic acid, preferably chloroacetic acid, to give a mixture comprising mono- and bis(α-halomethyl) esters, followed by reaction with an N,N-dimethyl $C_{16}$-$C_{18}$ alkyl amine.

In some aspects, the quaternary surfactant has a weight-average molecular weight within the range of 750 g/mol to 5000 g/mol, from 800 g/mol to 4000 g/mol, or from 1000 to 2500 g/mol.

In some aspects, the quaternary surfactant has a biodegradability in seawater according to OECD 306 of greater than 60% within 28 days. Biodegradability determinations are discussed in more detail below.

The Aqueous Brine

Pipelines and other metal equipment used in industrial applications, particularly the metal surfaces in the oil-and-gas industry that are exposed to seawater in offshore drilling rigs, land-based wellbores, or other briny environments, can corrode rapidly if left unprotected. As used herein, "aqueous brine" refers to seawater or other aqueous mixtures containing salts that are corrosive to metals and metal alloys such as carbon steel. The composition of the aqueous brine will often be characteristic of the well, whether it be ocean water or the brine present in a land-based wellbore.

Seawater contains about 3.5% sodium chloride. Synthetic seawater is conveniently made by combining 3.5 wt. % NaCl, 0.11 wt. % $CaCl_2$ dihydrate, 0.067 wt. % $MgCl_2$ hexahydrate, and 96.32 wt. % water. This mixture is also referred to herein as "NACE 3.5%," and it is used for testing the corrosion resistance of the inhibitor compositions. "Forties brine" refers to a brine composition relevant to North Sea formations, and it is conveniently made as described in the experimental section below.

Treating The Metal Surface

Metal surfaces are everywhere in industrial operations, and especially in equipment needed for the oil-and-gas industry. Many of these surfaces, particularly the inner surfaces of pipelines, are periodically or continuously in contact with an aqueous brine. Most metals and alloys will corrode naturally because metals prefer to exist in thermodynamically more-stable forms, particularly oxides. Of particular concern are metals that can corrode rapidly when exposed to brines, especially iron-containing compositions such as carbon steel and various steel alloys. By exposing the metal surface to a film-forming composition that contains a corrosion inhibitor, the metal will have a reduced tendency to corrode.

The metal surface is treated or coated with a film-forming composition comprising a quaternary surfactant as described above. The manner in which the treatment is performed depends on many factors, including the nature of the application, the location of the well or other equipment, whether the metal surface is continuously exposed to an aqueous brine, where the metal surface is located, and other factors that will be of concern to the skilled person. In some aspects, for instance, it may be desirable to inject or dose a desired concentration of the film-forming composition into a combination of oil and aqueous brine phases that are in continuous contact with a pipeline, fitting, gear, valve, piston, pump, or other metal equipment. In some aspects, the quaternary surfactant is used in the aqueous brine at a concentration within the range of 0.1 ppm to 1000 ppm, or from 1 ppm to 500 ppm, or from 10 ppm to 100 ppm.

Measuring Corrosion Resistance

Corrosion rates are usually measured in "mils per year" (mpy), and various test methods have been devised to evaluate corrosion under conditions that simulate operating pipelines. Some of these tests are based on linear polarization resistance (LPR). The LPR test discussed below, like other similar tests, employs a rotating steel electrode as the working electrode. The bubble test method (also discussed below) evaluates the ability of a corrosion inhibitor to partition from an oil phase to an aqueous brine phase in the absence of agitation. As the skilled person will appreciate, the inventive method is not limited to any particular method of measuring corrosion rates.

In some aspects, the film-forming compositions used in the inventive method provide an 18-hour efficiency of at least 75% when measured at 80° C. in NACE 3.5% brine/mineral oil at 25 ppm concentration of the quaternary surfactant at 25% actives content in methanol in the bubble test method described herein using a steel working electrode, a platinum electrode, and a standard calomel electrode.

In other aspects, the film-forming compositions used in the inventive method provide an 18-hour efficiency of at least 75% when measured at 80° C. in Forties brine/mineral oil at 25 ppm concentration of the quaternary surfactant at 25% actives content in methanol in the bubble test method described herein using a steel working electrode, a platinum electrode, and a standard calomel electrode.

The following examples merely illustrate the invention; the skilled person will recognize many variations that are within the spirit of the invention and scope of the claims.

Example 1

Preparation of Corrosion Inhibitor A

Polyethylene glycol (PEG 600, 642.6 g, 1.07 mol) is charged to a reaction vessel equipped with mechanical stirrer, heating mantle, distillation column, and nitrogen inlet. The PEG is heated under nitrogen to 80° C. Chloroacetic acid (202.4 g, 2.14 mol) is added with stirring. The reaction mixture is heated to 155° C. to 160° C. over 6 h while removing water by distillation. After testing for acid value, heating resumes for another 15 h until the acid value is 0.18 meq/g, indicating about 1.7 wt. % of residual chloroacetic acid. The reaction product is a mixture of mono- and bis($\alpha$-chloromethyl ester)s of PEG 600.

A portion of the product from the first step (503.3 g) is charged to a reactor. N,N-Dimethylhexadecylamine (335.4 g) is added, and the mixture is heated to 75° C. for 3 h. The mixture becomes viscous and is difficult to stir. The product is a brown solid at 25° C. and an amber liquid at 50° C. Acidity: 0 meq/g; alkalinity: 0.081 meq/g; pH (5% water in isopropyl alcohol): 7.1; actives: 100%.

Example 2

Preparation of Corrosion Inhibitor B

Polyethylene glycol (PEG 1500, 540 g, 0.36 mol) is charged to a reaction vessel equipped as previously described. The PEG is heated under nitrogen to 150° C. Chloroacetic acid (68.5 g, 0.73 mol) and titanium(IV) butoxide (1.1 g) are added. The reaction mixture is heated to 150° C. over 18 h while removing water by distillation until the acid number reaches 0.12 meq/g. The reaction product is a mixture of mono- and bis($\alpha$-chloromethyl ester)s of PEG 1500.

A portion of the product from the first step (260 g) is charged to a reactor. N,N-Dimethylhexadecylamine (85.9 g, 0.315 mol) is added, and the mixture is heated to 75° C. for 6 h while adding isopropyl alcohol (38 g total) as needed to enable stirring. The product has acidity: 0.13 meq/g; alkalinity: 0.045 meq/g; actives: 90% in isopropyl alcohol.

Example 3

Preparation of Corrosion Inhibitor C

A portion of the mono- and bis($\alpha$-chloromethyl ester) product from Example 2 (122 g) is charged to a reactor. N,N-Dimethyloctadecylamine (44.3 g, 0.148 mol) is added, and the mixture is heated to 75° C. for 6 h while adding isopropyl alcohol (18 g total) as needed to enable stirring. The product has acidity: 0.12 meq/g; alkalinity: 0.069 meq/g; actives: 90% in isopropyl alcohol.

Example 4

Preparation of Corrosion Inhibitor D

The procedure of Example 1 is generally followed using PEG 600 (476 g), chloroacetic acid (159.5 g), and N,N-dimethylhexadecylamine (176.7 g). The product, an amber liquid at 50° C. and a white solid at 20° C., has acidity: 0.23 meq/g; alkalinity: 0.155 meq/g; pH (5% water in isopropyl alcohol): 7.25; actives: 90% in isopropyl alcohol.

Comparative Example 5

Preparation of Corrosion Inhibitor E

A sample of the PEG 600-based mono- and bis($\alpha$-chloromethyl ester) mixture produced in Example 4 (317 g) is reacted with a mixture of N,N-dimethyldodecylamine and N,N-dimethyltetradecylamine (200 g, 0.88 mol). The product, a yellow paste at 20° C., has acidity: 0.30 meq/g; alkalinity: 0.227 meq./g; pH (5% water in isopropyl alcohol): 7.85; actives: 90% in isopropyl alcohol.

Comparative Example 6

Preparation of Corrosion Inhibitor F

Polyethylene glycol (PEG 4000, 500 g, 0.125 mol) is charged to a reaction vessel equipped as previously described. The PEG is heated under nitrogen to 150° C. Chloroacetic acid (24.6 g, 0.26 mol) and titanium(IV) butoxide (1.0 g) are added. The reaction mixture is heated to 150° C. over 18 h while removing water by distillation until the acid number reaches 0.12 meq/g. The reaction product is a mixture of mono- and bis($\alpha$-chloromethyl ester)s of PEG 4000.

The product from the first step (520 g) is charged to a reactor. N,N-Dimethylhexadecylamine (71.0 g, 0.26 mol) is added, and the mixture is heated to 75° C. for 6 h while adding isopropyl alcohol (66 g total) as needed to enable stirring. The product has alkalinity: 0.118 meq/g; actives: 90% in isopropyl alcohol.

Comparative Example 7

Preparation of Corrosion Inhibitor G

The procedure of Comparative Example 6 is generally followed to prepare the mixture of mono- and bis(α-chloromethyl ester)s of PEG 4000.

The product from the first step (520 g) is charged to a reactor. N,N-Dimethyloctadecylamine (77.0 g, 0.26 mol) is added, and the mixture is heated to 75° C. for 6 h while adding isopropyl alcohol (66 g total) as needed to enable stirring. The product has acidity: 0.30 meq/g; alkalinity: 0.11 meq/g; actives: 90% in isopropyl alcohol.

Comparative Example 8

Preparation of Corrosion Inhibitor H

The procedure of Example 1 is generally followed to produce the mixture of mono- and bis(α-chloromethyl ester)s of PEG 600. A portion of this mixture (8.0 g) is combined in a reaction vessel with an amidoamine (6.0 g, 0.022 mol) generated from a $C_{12}$-$C_{14}$ methyl ester mixture and dimethylaminopropylamine (DMAPA), after methanol removal. The reactants are stirred and heated at 65° C. over 48 h. Isopropyl alcohol (1.6 g) is added when the product becomes too viscous to stir. The product has alkalinity: 0.12 meq/g; actives: 90% in isopropyl alcohol.

Comparative Example 9

Preparation of Corrosion Inhibitor I

The procedure of Example 1 is generally followed to produce a mixture of mono- and bis(α-chloromethyl ester)s of PEG 600. A portion of this mixture (7.2 g) is combined in a reaction vessel with an amidoamine (7.0 g, 19 mmol) generated from a $C_{16}$-$C_{18}$ methyl ester and DMAPA, after methanol removal. The reactants are stirred and heated at 65° C. over 48 h. Isopropyl alcohol (1.6 g) is added when the product becomes too viscous to stir. The product has alkalinity: 0.19 meq/g; actives: 90% in isopropyl alcohol.

Comparative Example 10

Preparation of Corrosion Inhibitor J

The procedure of Example 2 is generally followed to produce a mixture of mono- and bis(α-chloromethyl ester)s of PEG 1500. A portion of this mixture (53.0 g) is combined in a reaction vessel with an amidoamine (23.3 g, 65 mmol) generated from a $C_{16}$-$C_{18}$ methyl ester and DMAPA, after methanol removal. The reactants are stirred and heated at 65° C. over 48 h. Isopropyl alcohol (8.5 g) is added when the product becomes too viscous to stir. The product has alkalinity: 0.67 meq/g; actives: 90% in isopropyl alcohol.

Comparative Example 11

Preparation of Corrosion Inhibitor K

The procedure of Example 2 is generally followed to produce a mixture of mono- and bis(α-chloromethyl ester)s of PEG 1500. A portion of this mixture (53.0 g) is combined in a reaction vessel with an amidoamine (18.0 g, 64 mmol) generated from a $C_{12}$-$C_{14}$ methyl ester and DMAPA, after methanol removal. The reactants are stirred and heated at 65° C. over 48 h. Isopropyl alcohol (8.0 g) is added when the product becomes too viscous to stir. The product has alkalinity: 0.14 meq/g; actives: 90% in isopropyl alcohol.

Comparative Example 12

Preparation of Corrosion Inhibitor L

Ethylene glycol ("MEG", 129 g, 2.08 mol) is charged to a reaction vessel equipped as previously described. The MEG is warmed under nitrogen to 60° C. Chloroacetic acid (391 g, 4.14 mol) is carefully added over 0.5 h, and the mixture is heated gradually to 150° C. over 7 h while removing water by distillation until the acid number reaches 0.31 meq/g. The expected reaction product is the bis(α-chloromethyl ester) of ethylene glycol.

A portion of the product from the first step (158 g) is charged to a reactor. N,N-Dimethyldodecylamine (319 g, 1.5 mol) is warmed, then added, and the mixture is heated to 75° C. for 1 h while adding isopropyl alcohol (100 g total) as needed to enable stirring. The product has alkalinity: 0.140 meq/g; actives: 83% in isopropyl alcohol.

Comparative Example 13

Preparation of Corrosion Inhibitor M

A portion of the product from the first step of Comparative Example 12 (174 g) is charged to a reactor. N,N-Dimethyltetradecylamine (400 g, 1.66 mol) is warmed, then added, and the mixture is heated to 75° C. for 1 h while adding isopropyl alcohol (100 g total) as needed to enable stirring. The product has alkalinity: 0.170 meq/g; actives: 85% in isopropyl alcohol.

NACE 3.5%

Synthetic seawater is made by combining 3.5 wt. % NaCl, 0.11 wt. % $CaCl_2$ dihydrate, 0.067 wt. % $MgCl_2$ hexahydrate, and 96.32 wt. % water.

Forties Brine

"Forties brine" is made in two parts. The first part is made by combining sodium chloride (49.15 g), magnesium chloride hexahydrate (2.79 g), potassium chloride (0.47 g), calcium chloride dihydrate (6.71 g) and water (600.9 g). The second part is made by combining sodium bicarbonate (0.45 g) with water (39.55 g). The first part of the Forties brine is saturated with carbon dioxide before adding the aqueous sodium bicarbonate solution to it. This avoids forming calcium carbonate.

Corrosion Resistance Testing (Linear Polarization Resistance "LPR")

Corrosion inhibition of various test samples is evaluated in synthetic seawater ("NACE 3.5%," 3.5% NaCl content) or Forties brine using a well-known linear polarization resistance technique at 50° C. with a carbon steel working electrode (spinner set to 3000 rpm), a platinum counter electrode, and a standard calomel reference electrode. The electrodes are placed in a jacketed glass cell containing 700 mL of seawater, and the corrosion inhibitor sample (70 mg of a 5 wt. % active solution, resulting in a dosage of 5 ppm) is injected after a baseline corrosion rate has been recorded. The seawater is pre-sparged with carbon dioxide to remove oxygen, and carbon dioxide is introduced at 50 mL/min during the test to maintain a constant pH.

Figure 2:
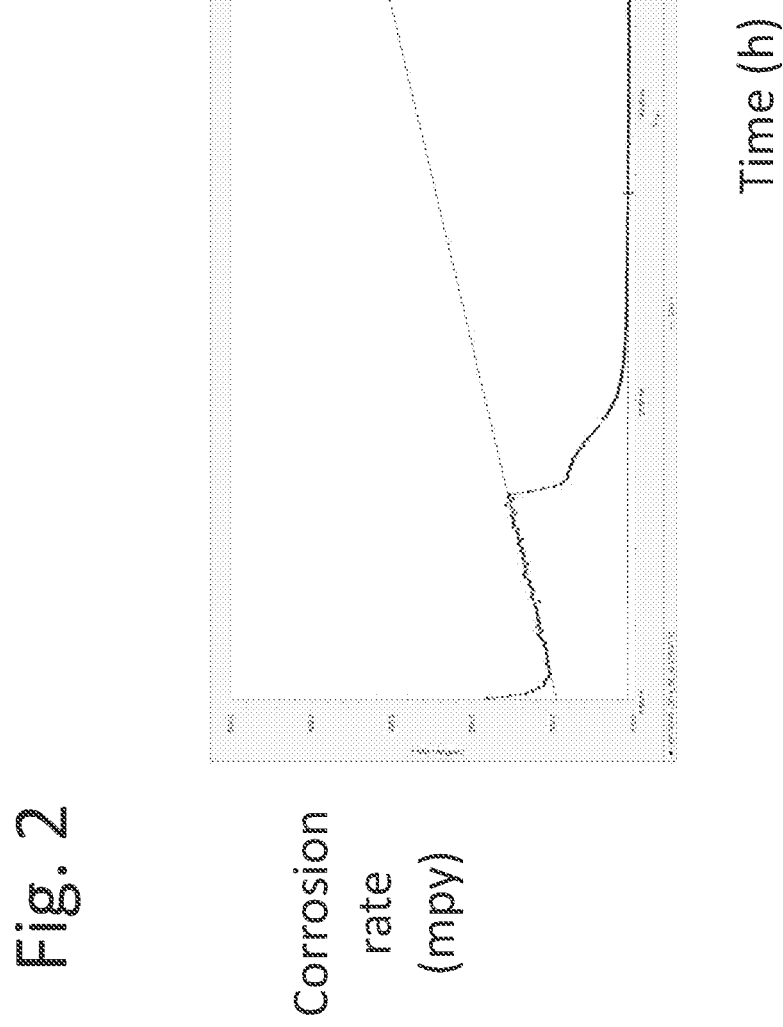
FIG. 2 plots results from an LPR test for comparative corrosion inhibitor M.
Figure 3:
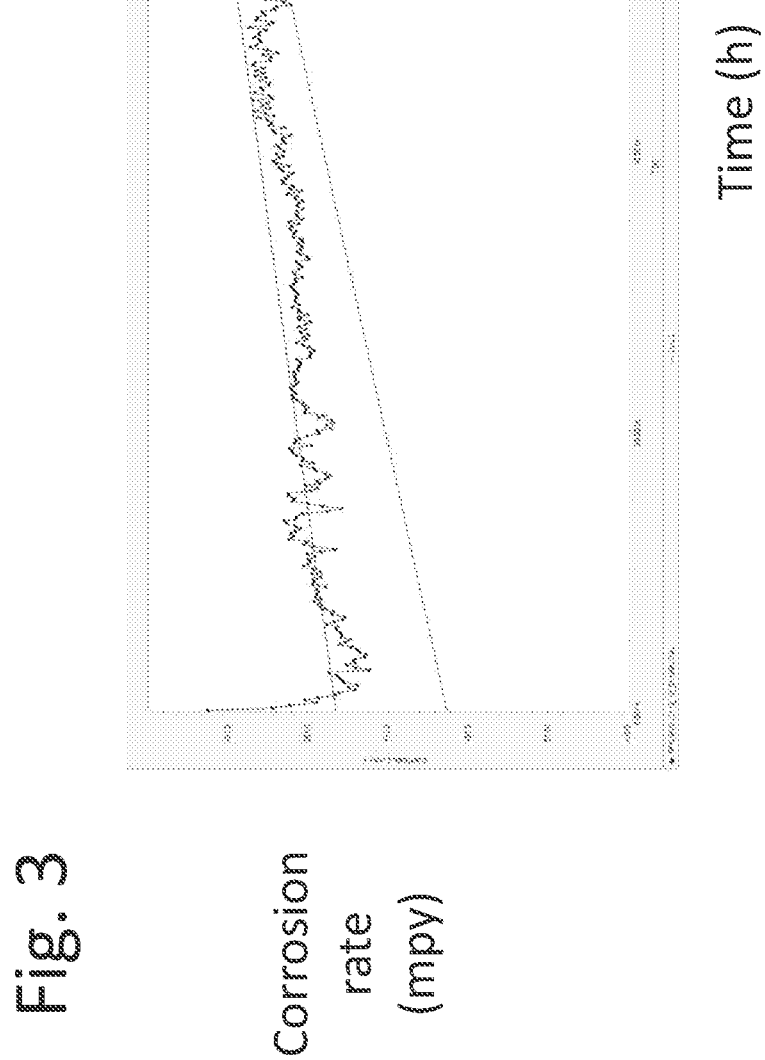
FIG. 3 plots results from an LPR test for comparative corrosion inhibitor K.
Figure 4:
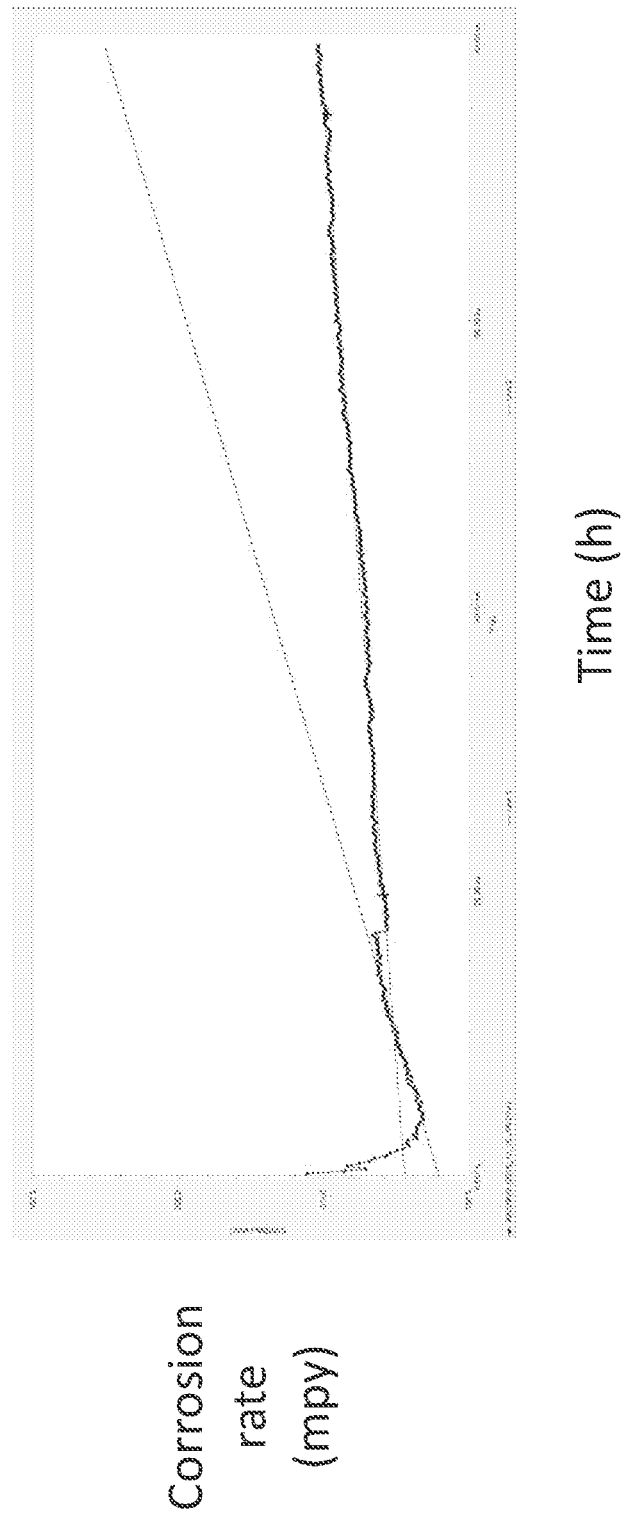
FIG. 4 plots results from an LPR test for comparative corrosion inhibitor F.
Figure 5:
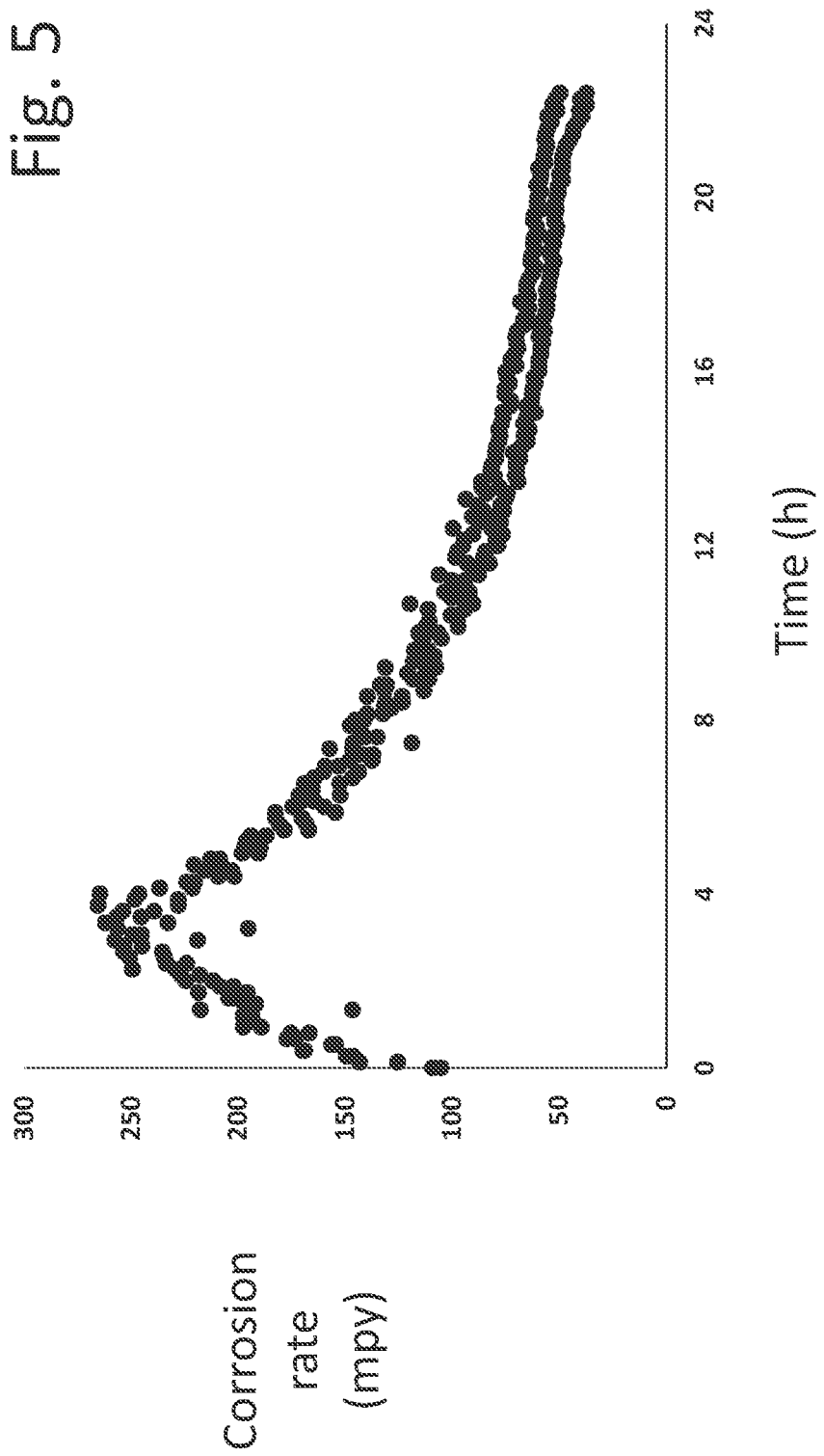
FIG. 5 plots results from a bubble test in NACE 3.5% brine to measure corrosion resistance versus time for inventive corrosion inhibitor A.
Figure 6:
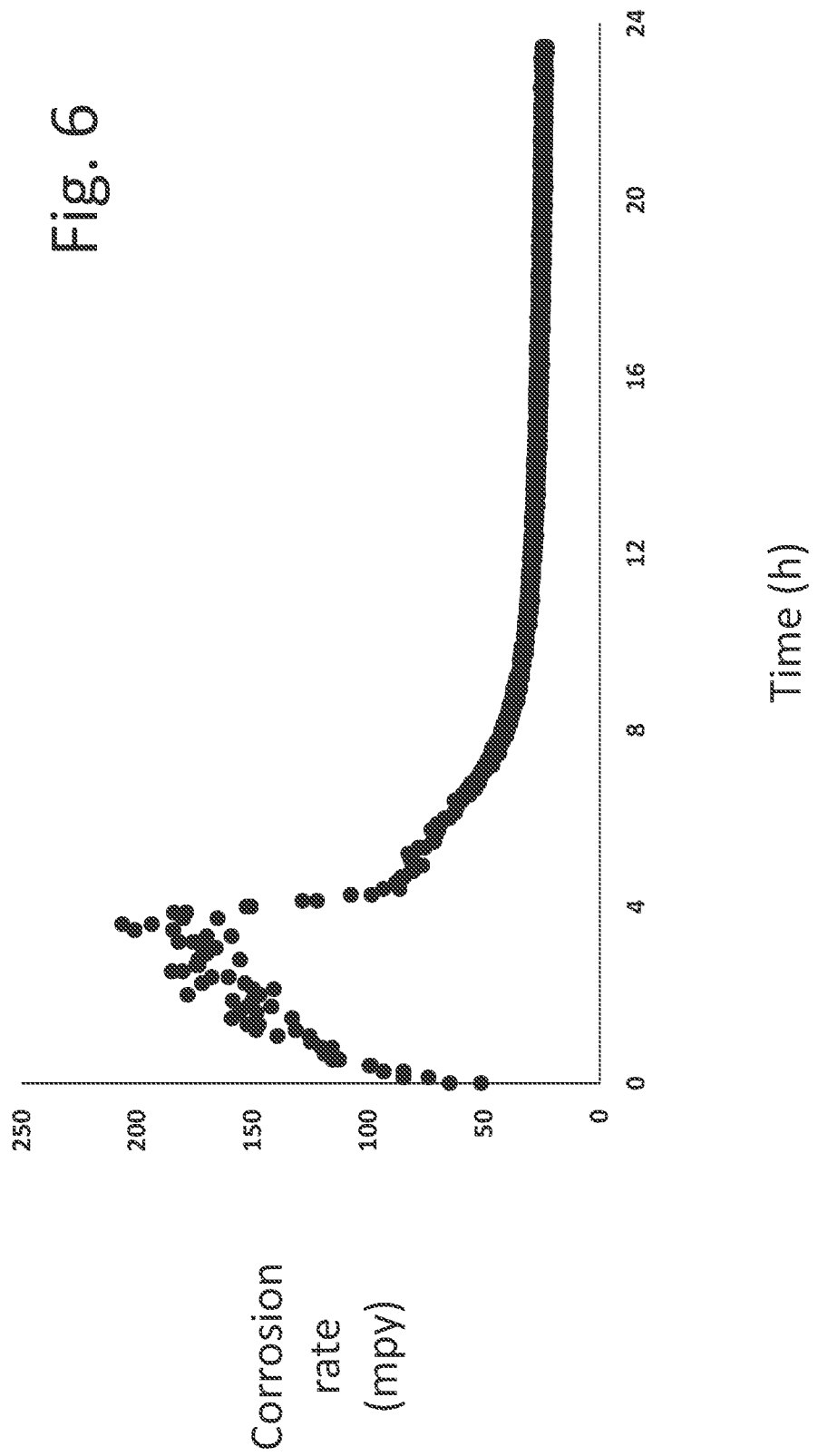
FIG. 6 plots results from a bubble test in Forties brine for inventive corrosion inhibitor A.
Figure 7:
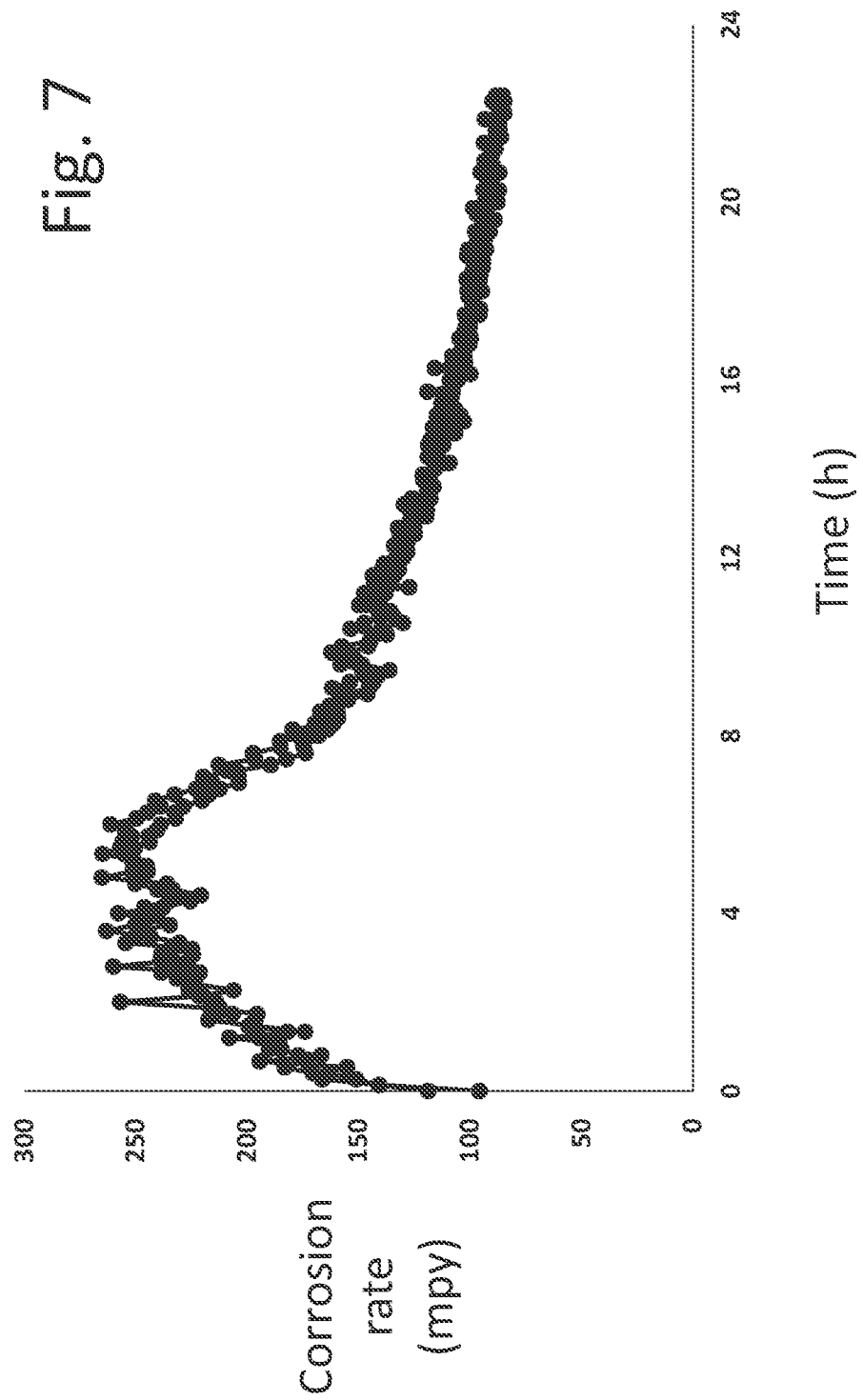
FIG. 7 plots results from a bubble test in NACE 3.5% brine for inventive corrosion inhibitor B.
Figure 8:
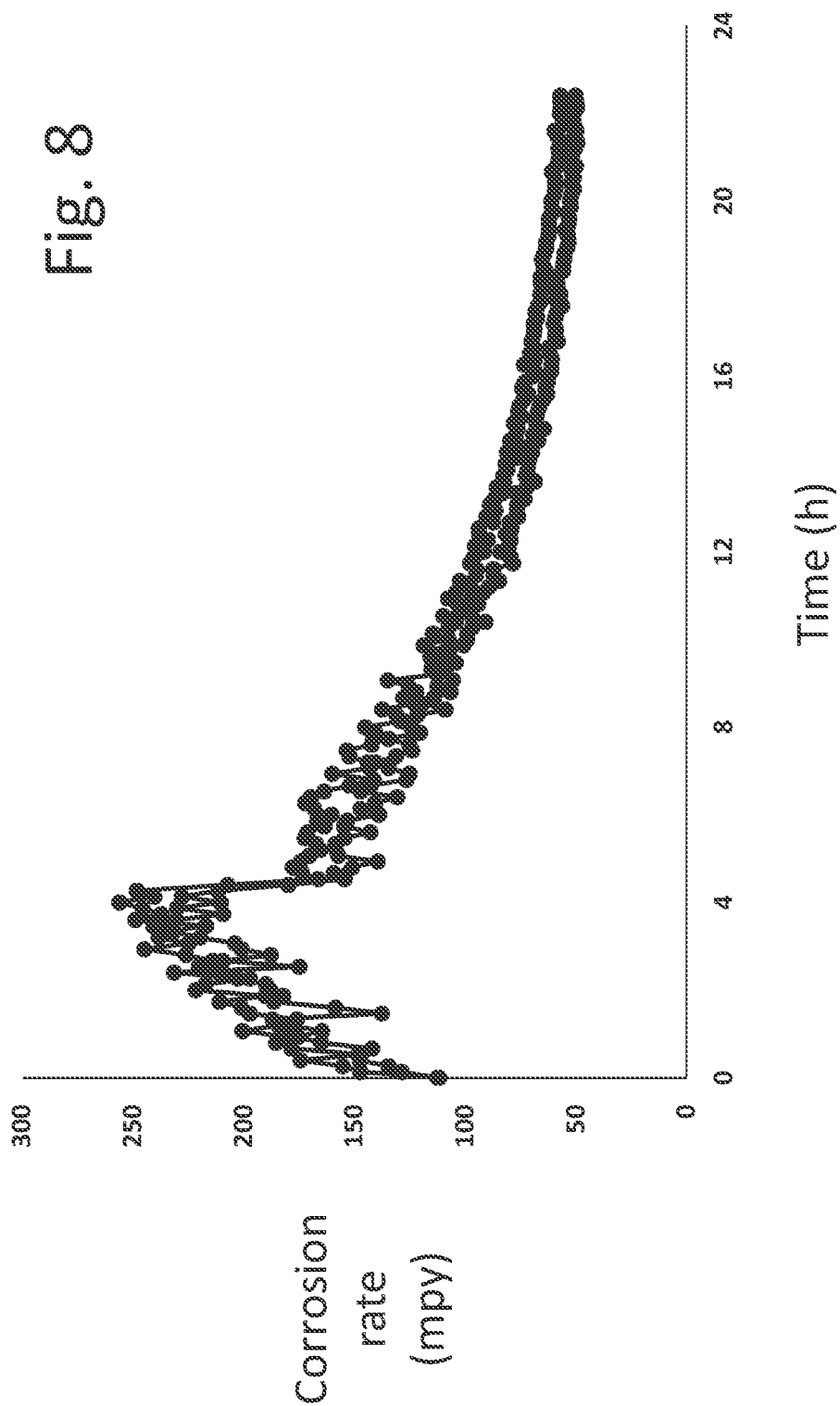
FIG. 8 plots results from a bubble test in NACE 3.5% brine for inventive corrosion inhibitor C.

Without corrosion inhibitor present, the baseline corrosion rate in synthetic seawater is within the range of 180 to 300 mpy (mils per year). After injection of the corrosion inhibitor sample, data is collected for about 16 h. Corrosion rate data are measured and monitored as a function of time using a Gamry potentiostat. Gamry framework software is used for analysis. The initial and final corrosion rates are recorded. Results of this test appear in Table 1. Sample output from test runs is shown in FIGS. 1-4; FIGS. 1 and 2 illustrate successful corrosion inhibition, while FIGS. 3 and 4 show results from unsuccessful experiments.

Bubble Test Method

The test measures the ability of a corrosion inhibitor to partition into an aqueous brine phase from a hydrocarbon phase and thereby protect a steel electrode from corrosion by the brine. The setup includes a 1-L kettle equipped with a steel working electrode, a platinum electrode, a standard calomel electrode, a clampable lid, a gas outlet, a heating mantle, a temperature controller, and an injection port. No stirring is used. After positioning the electrodes, the kettle is charged with Forties brine or NACE 3.5% brine (700 g) and LVT 200 mineral oil (300 g), and the mixture is equilibrated at 80° C. Corrosion inhibitor samples (2.5 g) are diluted with methanol (7.5 g); in some cases, the samples are warmed to 50° C. to make a homogeneous solution. An initial corrosion resistance value is measured and recorded. A 100-µL sample (25 ppm dosage) is then injected into the mineral oil phase. The corrosion resistance value 2 h and 18 h after the sample is injected are determined and reported. Results of the bubble test experiments are reported in Table 2. Sample output from test runs is shown in FIGS. 5-10; FIGS. 5-8 illustrate successful corrosion inhibition, while FIG. 9 shows only a marginal improvement and FIG. 10 shows an unsuccessful experiment.

Biodegradability

An outside testing laboratory evaluated samples of corrosion inhibitors in accord with OECD 306 (OECD Guideline for Testing of Chemicals— Biodegradability in Seawater OECD, Paris). A "readily biodegradable" material demonstrates >60% biodegradation in 28 days in the test.

A sample of corrosion inhibitor A had biodegraded 65% by Day 20 of the 28-day test and was considered "readily biodegradable" according to the test criteria.

Results

As shown in Table 1, good results in the LPR test in either NACE 3.5% or Forties brine are demonstrated with a quaternary surfactant made by reacting PEG 600 with chloroacetic acid, followed by quaternization with an N,N-dimethyl Cm alkyl amine (inhibitors A and D).

Good results in this test are also achieved with a Gemini surfactant made similarly from ethylene glycol, chloroacetic acid, and an N,N-dimethyl $C_{12}$ (or $C_{14}$) alkylamine.

Poor results are observed when the quaternary surfactant is made from PEG 4000 and an N,N-dimethyl $C_{16}$-$C_{18}$ alkylamine, from PEG 600 and an N,N-dimethyl $C_{12}$-$C_{14}$ alkylamine, from PEG 600 and a $C_{16}$-$C_{18}$ amidoamine, or from PEG 1500 and a $C_{16}$-$C_{18}$ amidoamine.

TABLE 1

Corrosion Results: LPR Method

| Corrosion inhibitor | Description | Brine | $CR_{initial}$ (mpy) | $CR_{final}$ (mpy) |
|---|---|---|---|---|
| A | PEG 600/$C_{16}$ amine | NACE 3.5% | 86 | 10 |
| D | PEG 600/$C_{16}$ amine | NACE 3.5% | 176 | 6.0 |
| D | PEG 600/$C_{16}$ amine | NACE 3.5% | 264 | 20 |
| D | PEG 600/$C_{16}$ amine | Forties brine | 138 | 3.5 |
| D | PEG 600/$C_{16}$ amine | Forties brine | 107 | 9.1 |
| E* | PEG 600/$C_{12}$-$C_{14}$ amine | NACE 3.5% | 126 | 123 |
| F* | PEG 4000/$C_{16}$ amine | NACE 3.5% | 154 | 188 |
| G* | PEG 4000/$C_{18}$ amine | NACE 3.5% |  | fails |
| I* | PEG 600/$C_{16}$-$C_{18}$ amidoamine | NACE 3.5% | 156 | 90 |
| J* | PEG 1500/$C_{16}$-$C_{18}$ amidoamine | NACE 3.5% | 218 | 196 |
| K* | PEG 1500/$C_{12}$-$C_{14}$ amidoamine | NACE 3.5% | 200 | 237 |
| L* | MEG/$C_{12}$ amine | NACE 3.5% | 195 | 17 |
| M* | MEG/$C_{14}$ amine | NACE 3.5% | 132 | 5.1 |

*Comparative example

As shown in Table 2, good results in the bubble test can be achieved in NACE 3.5% brine or Forties brine with quaternary surfactants made using N,N-dimethyl $C_{16}$-$C_{18}$ alkylamines and PEGs having an average of 10 to 50 EO groups, such as PEG 600 and PEG 1500 (inhibitors A, B, and C). In contrast, poor results are seen with surfactants based on PEG 4000 (comparative inhibitor F), surfactants based on a $C_{16}$-$C_{18}$ or a $C_{12}$-$C_{14}$ amidoamine (comparative inhibitors H, I, and J), and surfactants based on an N,N-dimethyl $C_{12}$-$C_{14}$ alkylamine (comparative inhibitor K). Surprisingly, the Gemini surfactants (comparative inhibitors L and M) also fail the bubble test despite giving good results in the LPR test. The greater hydrophilicity of the PEG linker may help to facilitate migration of the inventive inhibitors into the aqueous phase.

TABLE 2

Corrosion Results: Bubble Test Method

| CI | Description | Brine | $CR_{initial}$ (mpy) | $CR_{2h}$ (mpy) | $CR_{final}$ (mpy) | 18-h effic. (%) |
|---|---|---|---|---|---|---|
| A | PEG 600/$C_{16}$ amine | NACE 3.5% | 248 | 165 | 48 | 81 |
| B | PEG 1500/$C_{16}$ amine | NACE 3.5% | 248 | 239 | 88 | 65 |
| C | PEG 1500/$C_{18}$ amine | NACE 3.5% | 232 | 154 | 53 | 77 |
| A | PEG 600/$C_{16}$ amine + 2-mercaptoethanol | NACE 3.5% | 230 | 19 | 21 | 91 |
| A | PEG 600/$C_{16}$ amine | Forties brine | 183 | 64 | 24 | 87 |
| B | PEG 1500/$C_{16}$ amine | Forties brine | 189 | 80 | 23 | 88 |

TABLE 2-continued

Corrosion Results: Bubble Test Method

| CI | Description | Brine | CR$_{initial}$ (mpy) | CR$_{2h}$ (mpy) | CR$_{final}$ (mpy) | 18-h effic. (%) |
|---|---|---|---|---|---|---|
| C | PEG 1500/C$_{18}$ amine | Forties brine | 175 | 85 | 34 | 81 |
| A | PEG 600/C$_{16}$ amine + 2-mercaptoethanol | Forties brine | 188 | 12 | 14 | 93 |
| F* | PEG 4000/C$_{16}$ amine | NACE 3.5% | 149 | — | 72 | 52 |
| F* | PEG 4000/C$_{16}$ amine | NACE 3.5% | 150 | — | 64 | 57 |
| F* | PEG 4000/C$_{16}$ amine | NACE 3.5% | 214 | — | 105 | 51 |
| H* | PEG 600/C$_{12}$-C$_{14}$ amidoamine | NACE 3.5% | 173 | — | 280 | 0 |
| H* | PEG 600/C$_{12}$-C$_{14}$ amidoamine | NACE 3.5% | 155 | — | 195 | 0 |
| I* | PEG 600/C$_{16}$-C$_{18}$ amidoamine | NACE 3.5% | 175 | — | 88 | 50 |
| I* | PEG 600/C$_{16}$-C$_{18}$ amidoamine | NACE 3.5% | 258 | — | 160 | 38 |
| J* | PEG 1500/C$_{16}$-C$_{18}$ amidoamine | NACE 3.5% | 129 | — | 137 | 0 |
| J* | PEG 1500/C$_{16}$-C$_{18}$ amidoamine | NACE 3.5% | 118 | — | 149 | 0 |
| J* | PEG 1500/C$_{16}$-C$_{18}$ amidoamine | NACE 3.5% | 164 | — | 135 | 18 |
| K* | PEG 1500/C$_{12}$-C$_{14}$ amidoamine | NACE 3.5% | 184 | — | 216 | 0 |
| L* | MEG/C$_{12}$ amine | NACE 3.5% | 138 | — | 192 | 0 |
| L* | MEG/C$_{12}$ amine | NACE 3.5% | 115 | — | 149 | 0 |
| M* | MEG/C$_{14}$ amine | NACE 3.5% | 130 | — | 181 | 0 |
| M* | MEG/C$_{14}$ amine | NACE 3.5% | 164 | — | 212 | 0 |

*Comparative example

Conditions: 80° C., 25 ppm corrosion inhibitor. CR$_{final}$ determined at 18 h (inhibitors A-C) or 20 h (inhibitors F-M).

The preceding examples are meant only as illustrations; the following claims define the inventive subject matter.

We claim:

1. A method which comprises inhibiting corrosion of a metal surface that is exposed to an aqueous brine by treating the surface with a film-forming composition comprising a quaternary surfactant, wherein the surfactant is made by reacting a polyalkylene glycol (PAG), a haloalkanoic acid, and a tertiary fatty amine, and wherein the surfactant comprises a PAG monoester quat and a PAG diester diquat.

2. The method of claim 1 wherein the surfactant is made by reacting a polyalkylene glycol with chloroacetic acid, followed by a reaction with an N,N-dialkyl C$_{16}$-C$_{18}$ fatty amine, an N,N-dialkyl C$_{16}$-C$_{18}$ fatty amidoamine, or an N,N-dialkyl C$_{16}$-C$_{18}$ fatty esteramine.

3. The method of claim 1 wherein the PAG has a number-average molecular weight within the range of 200 to 2500 g/mol.

4. The method of claim 1 wherein the PAG diester diquat has the structure:

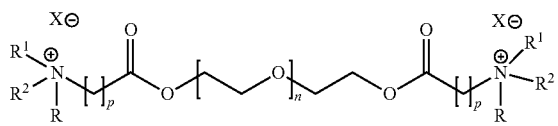

and the PAG monoester quat has the structure:

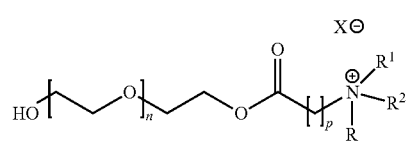

wherein X is OH, Cl, Br, I, or F; each R is independently a C$_{10}$-C$_{24}$ alkyl group that optionally incorporates an amide or ester functionality; R$^1$ is C$_1$-C$_4$ alkyl or R$^3$[OA]$_m$-; R$^3$ is C$_1$-C$_4$ alkyl; OA is a C$_2$-C$_4$ oxyalkylene group; m is from 1 to 5; p is from 1 to 5; R$^2$ is R or R$^1$; and n is within the range 4 to 90.

5. The method of claim 1 wherein the PAG diester diquat has the structure:

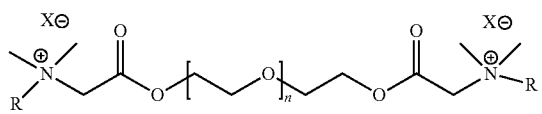

and the PAG monoester quat has the structure:

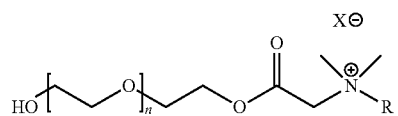

wherein X is Cl or Br; each R is independently a C$_{16}$-C$_{18}$ alkyl group; and n is within the range 8 to 50.

6. The method of claim 5 wherein n has a value within the range of 9 to 15.

7. The method of claim 5 wherein n has a value within the range of 30 to 40.

8. The method of claim 1 wherein X is Cl.

9. The method of claim 1 wherein the haloalkanoic acid is chloroacetic acid.

10. The method of claim 1 wherein the quaternary surfactant is produced by reacting PEG 600 or PEG 1500 with chloroacetic acid to give a mixture comprising mono- and bis(α-chloromethyl) esters, followed by reaction with an N,N-dimethyl C$_{16}$-C$_{18}$ alkyl amine.

11. The method of claim 1 wherein the method is used in an oilfield application.

12. The method of claim 1 wherein the quaternary surfactant has a weight-average molecular weight within the range of 750 to 5000 g/mol.

13. The method of claim 1 wherein the quaternary surfactant has a biodegradability in seawater according to OECD 306 of greater than 60% within 28 days.

14. The method of claim 1 wherein the metal is carbon steel.

15. The method of claim 1 wherein the aqueous brine is seawater.

16. The method of claim 1 wherein the aqueous brine is Forties brine.

17. The method of claim 1 wherein the quaternary surfactant is used at a concentration in the aqueous brine within the range of 0.1 to 1000 ppm.

18. The method of claim 1 wherein the quaternary surfactant is used at a concentration in the aqueous brine within the range of 1 to 500 ppm.

19. The method of claim 1 wherein the composition provides an 18-hour efficiency of at least 75% when measured at 80° C. in NACE 3.5% brine/mineral oil at 25 ppm concentration of the quaternary surfactant at 25% actives content in methanol in the bubble test method described herein using a steel working electrode, a platinum electrode, and a standard calomel electrode.

20. The method of claim 1 wherein the composition incudes a sulfur-containing intensifier.

\* \* \* \* \*